(No Model.) 2 Sheets—Sheet 1.

J. MACDONALD.
FRICTION CLUTCH.

No. 371,606. Patented Oct. 18, 1887.

Witnesses:
J. B. Halpenny.
M. M. Gridley.

Inventor:
James Macdonald
By Gridley & Fletcher
his Attys.

N. PETERS, Photo-Lithographer, Washington, D. C.

(No Model.) 2 Sheets—Sheet 2.

J. MACDONALD.
FRICTION CLUTCH.

No. 371,606. Patented Oct. 18, 1887.

Witnesses:
J. B. Halpenny
M. M. Gridley

Inventor:
James Macdonald,
By Gridley & Fletcher
his Attys.

UNITED STATES PATENT OFFICE.

JAMES MACDONALD, OF CHICAGO, ILLINOIS.

FRICTION-CLUTCH.

SPECIFICATION forming part of Letters Patent No. 371,606, dated October 18, 1887.

Application filed December 23, 1886. Serial No. 222,355. (No model.)

*To all whom it may concern:*

Be it known that I, JAMES MACDONALD, of Chicago, in the county of Cook and State of Illinois, have invented certain new and useful Improvements in Friction-Clutches, of which the following is a description, reference being had to the accompanying drawings, forming a part of this specification, in which—

Figure 1:
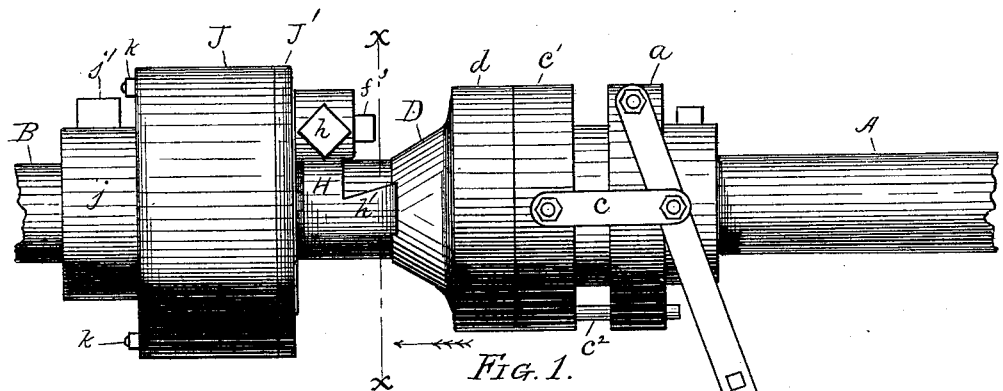
Figure 2:
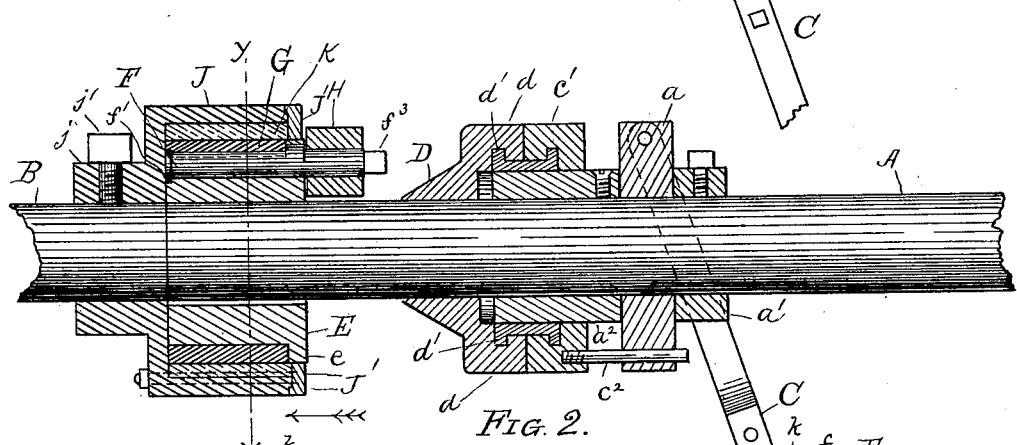
Figures 3, 4:
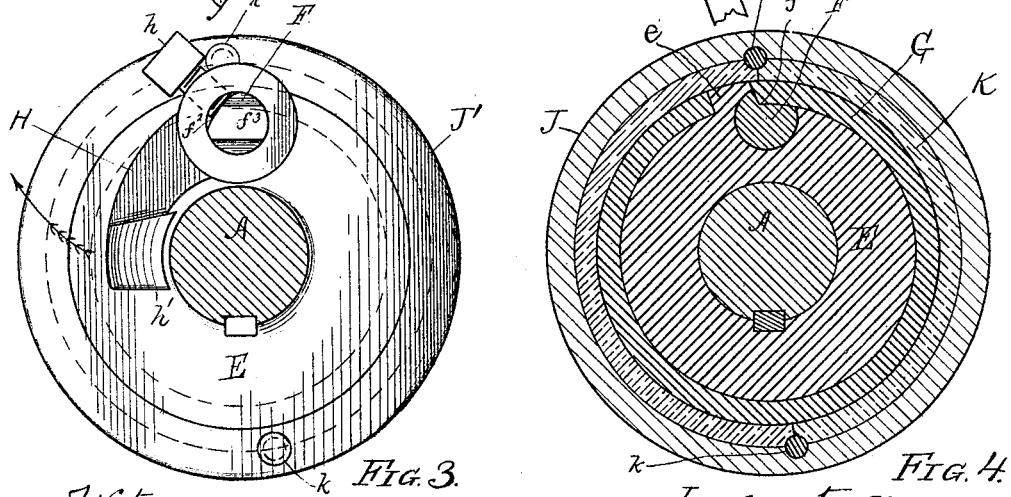
Figure 5:
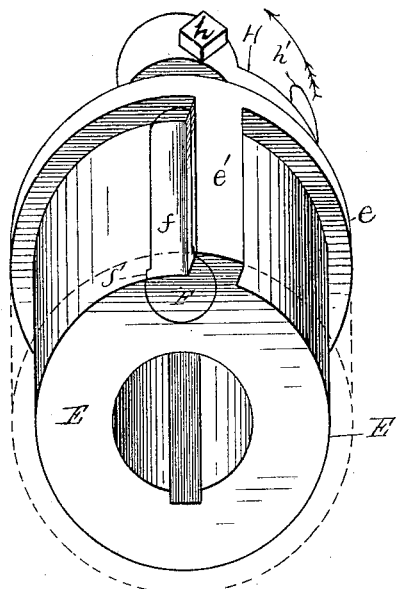
Figure 7:
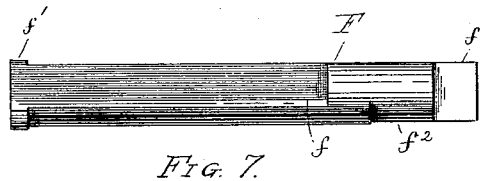
Figure 6:
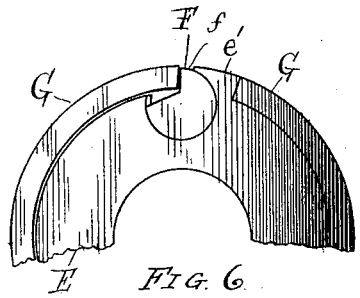
Figure 8:
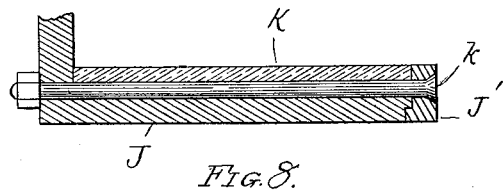

Figure 1 is a side view of said clutch and the shafts upon which the same is mounted. Fig. 2 is a vertical longitudinal sectional view of the same. Fig. 3 is a transverse sectional view upon the line $x\,x$, Fig. 1, viewed in the direction of the arrow there shown. Fig. 4 is a like sectional view upon the line $y\,y$, Fig. 2, viewed as indicated by the arrow in said figure. Fig. 5 is a detached perspective view of the hub to which the expanding-ring is attached, the notched pin or cam for producing said expansion being shown therein and the position of the ring indicated in dotted lines. Fig. 6 is an end view in detail of a portion of said hub, showing the manner of connecting the ring therewith, and the operating-cam. Fig. 7 is a side view of the cam or pin used to expand the ring, and Fig. 8 is a sectional view in detail of a portion of the annular shell or friction-ring.

Like letters of reference indicate like parts in the different figures.

My invention relates to that class of friction-clutches in which a broken ring is intended to be expanded within an annular shell or cylinder; and the object of my invention is to provide a simple and effective means for producing such expansion, as well as to so construct said clutch that it may be made very small and compact, while at the same time it may be caused to exert great power, and may be applicable to small shafts as well as to those of considerable size in proportion to the diameter thereof, all of which is hereinafter more particularly described, and definitely pointed out in the claims.

A in the drawings represents the driving and B the driven shaft. Upon the former is mounted a loose ring or disk, $a$, which is free to revolve upon the shaft, but is prevented from longitudinal movement by means of rings or sleeves $a'\,a^2$, Fig. 2, held rigidly upon the shaft by means of set-screws. A lever, C, is fulcrumed upon the ring $a$, and in turn attached by means of links $c$, one of which is shown in Fig. 1, to a secondary loose ring, $c'$, mounted upon the sleeve $a^2$, and provided with a pin, $c^2$, rigidly attached thereto, which passes loosely through the ring $a$, as shown, so that the axial movement of the two is rendered uniform.

A cone-shaped sleeve, D, is loosely mounted upon the shaft A, said sleeve having an enlarged portion, $d$, which overlaps the sleeve $a^2$ and abuts loosely against the ring $c'$, the two being loosely connected with each other by means of gibs $d'$, (see Fig. 2,) having projections or flanges, as shown, on the respective ends thereof, which are loosely fitted within interior grooves formed in said rings. This construction permits the cone D to be reciprocated upon the shaft by means of the lever C, while said cone is free to revolve independently of the rings $c'\,a$.

Keyed rigidly upon the end of the shaft A is a hub, E, upon the outer end of which is formed a rim or flange, $e$, and a radial projection or shoulder, $e'$, arranged longitudinally upon said hub. The hub E is so bored as to receive therein, near its periphery, a loose pin, F, so notched as to conform when in its normal position to the arc of the circle described by the circumference of the hub E and to one side of the flange $e'$, as shown at $f$.

Around the hub E, I place a broken ring, G, of spring-steel of such thickness and width as to cause it to be flush with the surface of the flanges $e\,e'$ and the end of said hub. One end of said ring is fitted to bear against one side of the flange $e'$ and the other rests in the notch $f$ of the pin F, said end bearing against the radial face of said notch. A shoulder, $f'$, is formed upon the part F, which is countersunk in the hub E, and upon the opposite end of said pin is attached, by means of a set-screw, $h$, a bent arm or lever, H, having a tapered flange, $h'$, bent at right angles thereto and adjusted to bear against the end of the cone D, as shown in Fig. 1. The part of the pin F upon which the set-screw bears is partially flattened, as shown at $f^2$, Figs. 3 and 7, the incline of said surface being such as to tighten the set-screw upon applying an outward pressure to the arm H. A rectangular projection, $f^3$, is also formed upon the outer end of the pin F, to which a wrench may be applied for the purpose of tightening the pressure of the notched face $f$ against the end of the ring G before securing the set-screw $h$.

Mounted upon the shaft B is an annular friction-ring or hollow cylinder having a hub, $j$, which is rigidly secured to said shaft by means of a set-screw, $j'$. The ring J is provided with an inner ring or friction surface, K, preferably of compressed paper, which I prefer to form in two or more pieces, said ring being prevented from slipping by means of bolts $k\ k$, which are embedded partly in the paper and partly in the metal ring, as clearly shown in Fig. 4. The bolts $k\ k$ serve as a means of attaching a flange, J', which is flush with the inner surface of the paper ring J, and serves to retain the latter within the ring. The interior diameter of the ring K is slightly larger than that of the ring G when the latter is in its normal position, so that the one is normally free to turn within the other.

The operation of said device is as follows: Upon moving the lever C forward the cone D is wedged between the shaft and the part $h'$ of the arm H, which serves to partially revolve the cam or pin F, thereby expanding the ring against the friction-surface K and revolving the cylinder J and shaft B when the shaft A is in motion.

I make no claim herein, except in combination, to the construction and arrangement of the friction-lining K, as the same will form the subject of a special application.

The principal advantage of said construction is, that the clutch may be made very small, while at the same time a powerful action may be produced thereby.

Having thus described my invention, what I claim, and desire to secure by Letters Patent, is—

1. The combination of the cylinder J, having an interior friction-surface, ring G, hub E, pin F, arm H, having the bent portion $h'$, and the loose cone D in operative connection with the lever C, substantially as described.

2. The combination of the cylinder J, having an interior lining of compressed paper, ring G, hub E, pin F, arm H, having the bent portion $h'$, and the loose cone D in operative connection with the lever C, substantially as and for the purposes specified.

3. The combination of the cam or pin F, provided with the partially-flattened surface $f^2$, arm H, and set-screw $h$, whereby said set-screw may be tightened in proportion as power is applied to said arm, with a hub, friction-ring and cylinder, and a sliding cone connected with a hand-lever, substantially as described.

4. In a friction-clutch having a friction-cylinder and expansion-ring adjusted upon a suitable hub therein, the combination of the cam or pin F, provided with the partially-flattened or eccentric surface $f^2$, arm H, and set-screw $h$, and part $f^3$, for adjusting the expansion of said ring to the wear of the interior friction-surface of the shell, with a loose cone in operative connection with a hand-lever, substantially as described.

JAMES MACDONALD.

Witnesses:
D. H. FLETCHER,
M. M. GRIDLEY.